US008234338B1

(12) United States Patent
Dagum et al.

(10) Patent No.: US 8,234,338 B1
(45) Date of Patent: Jul. 31, 2012

(54) SYSTEM AND METHOD FOR RELIABLE MESSAGE DELIVERY

(75) Inventors: Leonardo Dagum, Redwood City, CA (US); Vivek Vaidya, Sunnyvale, CA (US); Mala Anand, Hillsborough, CA (US); Pascal M. Bensoussan, Stanford, CA (US); David P. Mackler, Sunnyvale, CA (US); Vance Maverick, San Francisco, CA (US); Mihir R. Mehta, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 2274 days.

(21) Appl. No.: 09/839,314

(22) Filed: Apr. 20, 2001

(51) Int. Cl.
G06F 15/16 (2006.01)
G06F 15/173 (2006.01)

(52) U.S. Cl. ........ 709/206; 709/201; 709/202; 709/203; 709/204; 709/205; 709/217; 709/218; 709/219; 709/224

(58) Field of Classification Search .......... 709/201–206, 709/227–229, 217–219, 224
See application file for complete search history.

(56) References Cited

U.S. PATENT DOCUMENTS

| | | | | |
|---|---|---|---|---|
| 5,265,033 A * | 11/1993 | Vajk et al. | ..................... | 709/206 |
| 5,680,551 A * | 10/1997 | Martino, II | ..................... | 709/226 |
| 5,740,231 A * | 4/1998 | Cohn et al. | ................. | 379/88.22 |
| 5,757,669 A * | 5/1998 | Christie et al. | ................ | 709/205 |
| 6,134,582 A * | 10/2000 | Kennedy | ........................ | 709/206 |
| 6,363,411 B1 * | 3/2002 | Dugan et al. | .................. | 709/202 |
| 6,449,688 B1 * | 9/2002 | Peters et al. | ................... | 711/112 |
| 6,662,213 B1 * | 12/2003 | Xie et al. | ....................... | 709/206 |
| 7,290,056 B1 * | 10/2007 | McLaughlin, Jr. | ............. | 709/230 |
| 2002/0091815 A1 * | 7/2002 | Anderson et al. | .............. | 709/223 |
| 2003/0023709 A1 * | 1/2003 | Alvarez et al. | ................. | 709/223 |

OTHER PUBLICATIONS

Bass, Frank M., Purdue University, *A New Product Growth for Model Consumer Durables*, Management Science, vol. 15, No. 5, Jan. 1969, pp. 216-227.

(Continued)

Primary Examiner — Thu Nguyen
Assistant Examiner — Angela Widhalm
(74) Attorney, Agent, or Firm — Perkins Coie LLP

(57) ABSTRACT

A system for reliable message delivery includes a storage unit configured to store a message, and a message stored in the storage unit, wherein the message is persisted in the storage unit. The system also includes a status information associated with the message, the status information capable of indicating a first status. The system further includes a module coupled to the storage unit. The module is operable to execute on a computer and transmit the message to a second computer. The module is also operable to receive an acknowledgement from the second computer, and, in response to receiving the acknowledgement, the module is operable to indicate a second status in the status information. A method for providing reliable message delivery includes providing a storage unit configured to store a message and a message stored in the storage unit, wherein the message is persisted in the storage unit. The method also includes providing a record corresponding to the message, wherein the record is operable to store status information for the message. The method further includes storing a first status in the record, transmitting the message to a destination, and, in response to receiving an acknowledgement from the destination, storing a second status in the record.

15 Claims, 9 Drawing Sheets

OTHER PUBLICATIONS

Dagum, Camilo, Econometric Research Program Princeton University, *Structural Permanence: Its Role in the Analysis of Structural Dualisms and Dependences and for Prediction and Decision Purposes*, The Economics of Structural Change vol. 1, The International Library of Critical Writings in Economics, An Elgar Reference Collection, 1969, pp. 211-235.

Mahajan, Vijay, Muller, Eitan and Bass, Frank M., *New-Product Diffusion Models*, Chapter 8, Handbooks in OR & MS, vol. 5, J. Eliashberg and G.L. Lilien, Eds., 1993, pp. 349-408.

Hanssens, Dominique M. And Leonard, J. Parsons, *Econometric and Time-Series Market Response Models*, Chapter 9, Handbooks in OR & MS, vol. 5, J. Eliashberg and G.L. Lilien, Eds., 1993, pp. 409-464.

* cited by examiner

── 602

Registered Enterprise Table

| Enterprise ID | Destination |
|---|---|
|  |  |
|  |  |
| . | . |
|  |  |

Onsite Enterprise Table

| Enterprise ID | Destination |
|---|---|
|  |  |
|  |  |
| . | . |
|  |  |

FIG. 7

SYSTEM AND METHOD FOR RELIABLE MESSAGE DELIVERY

BACKGROUND

1. Field

The present invention relates generally to message delivery, and in particular, to a system and method for reliable message delivery.

2. Description of the Related Art

Information has become an important component to achieving business success in today's information age. A typical business decision or plan requires the input and analysis of many different pieces of information. This creates a correlation between the quality of information used and the quality of the business decision or plan, thus creating a need for information exchange between the information holder (the source of the information) and the information user (the maker of the business decisions and plans).

For example, in planning a manufacturing business, a manufacturer carries the risk of product over-supply or under-supply (supply risk). In the case of product over-supply, the manufacturer is left with eroding product inventory and the costs associated with the eroding inventory. In the case of product under-supply, the manufacturer is left with unsatisfied customers and the missed revenue opportunities. In addition to managing supply risk, the manufacturer has to also manage demand risk as manifest by, for example, its pricing decisions. A poor pricing decision may leave the manufacturer vulnerable to a competitor, which may result in product over-supply.

Production decisions are typically based on information such as product demand or sales forecasts, component supply plans, product shortage risks, product over-supply risks, component shortage risks, component over-supply risks, and the like. Typically, a production planner within the manufacturer performs a production analysis in an independent manner using historical information and estimates to arrive at a production plan or schedule. For example, some of the information can be from the actual component suppliers, rather than the production planner's estimation.

In addition to the telephone, facsimile (fax) and, more recently, electronic mail have become widely used communication tools used to convey such information. For example, a component supplier can send an email containing a component's pricing plan and production schedule to a manufacturer. The manufacturer can then incorporate the information contained in the email in its production decision analysis. Email transmission of information, as well as the other types of communication tools, is not seamless in that it requires manual management of the information by the parties involved in the communication.

For example, the manufacturer has to first receive the information, and then incorporate the received information into its production decision analysis. This typically requires a conversion of the information from one format (e.g., written) used by the communication tool to another format used in the production decision analysis (e.g., proprietary electronic format). Transmission of the information may also involve manual management. For example, telephone, fax, and electronic mail do not ensure transmission of the information. The telephone may be busy or not answered. The manufacturer's fax machine may be busy or the fax transmission unsuccessful due to a transmission error, and the retransmission attempts by the supplier's fax machine also unsuccessful. The email message may be undeliverable for various reasons. This may require that the component supplier retransmit the information numerous times before the manufacturer successfully receives the information.

The type of information used in performing business decision and plan analysis typically change frequently. The volatility of the information requires frequent communication of information, which further renders the manual management involved with the aforementioned communication tools increasingly burdensome. Thus, a communication system capable of receiving frequent information updates, and which seamlessly incorporates the information received in the business plan or decision analysis is desired. Furthermore, a communication system capable of ensuring the reliable delivery of information between the information provider and the information user is also desired.

SUMMARY

The present disclosure is directed to a system and corresponding methods that facilitate the reliable delivery of messages within or amongst computers and/or computing systems. Reliable message delivery is achieved by maintaining copies of messages in non-volatile memory and maintaining status information. Storing messages in non-volatile memory offers message persistence. For example, a sender persists (i.e., stores in non-volatile memory) a message before transmitting the message and associates an initial status to the message. The status is not updated to indicate successful delivery or transmission to a receiver until the receiver confirms that it has successfully persisted the transmitted message. The sender retransmits messages whose status does not indicate successful delivery.

In one embodiment, a sending module transmits or delivers a message to a receiving module. The sending module maintains or stores a copy of (i.e., persists) a message before transmitting the message, and associates a status of, for example, "sent" to the message. The receiving module receives the message, and upon successfully storing (i.e., persisting) the message, sends an acknowledgement to the sending module. The sending module receives the acknowledgement and updates the status associated with the copy of the transmitted message to, for example, "sent."

In another embodiment, a sending module transmits or delivers a message to a receiving module by persisting the message in a first memory that is accessible to both the sending and receiving module. The receiving module retrieves the message from the first memory, performs any required action, and persists the message in a second memory. Upon successfully persisting the message in the second memory, the receiving module removes the message from the first memory.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a system for reliable message delivery includes a storage unit and a message stored in the storage, wherein the message is persisted in the storage unit. The system also includes a status information associated with the message, where the status information capable of indicating a first status. The system further includes a module coupled to the storage unit. The module is operable to execute on a computer and transmit the message to a second computer. The module is also operable to receive an acknowledgement from the second computer, and, in response to receiving the acknowledgement, the module is operable to indicate a second status in the status information.

In another embodiment, a system for reliable message reception includes a storage unit and a module coupled to the storage unit, wherein the module is operable to execute on a computer. The module is operable to receive a message from a second computer, persist the message in the storage unit, and, in response to successfully persisting the message in the storage unit, transmit an acknowledgement to the second computer.

In still another embodiment, a system for reliable message delivery between a first module and a second module includes a computer and a first module that is operable to execute on the computer. The first module is operable to create a first persistence of a message in a first location. The system also includes a second module that is operable to execute on the computer. The second module is operable to retrieve the message from the first location, create a second persistence of the message in a second location, and, in response to successfully creating the second persistence of the message, remove the first persistence of the message.

In yet another embodiment, a method for providing reliable message delivery includes: providing a memory storing a message, the message being persisted in the memory; providing a record corresponding to the message, the record operable to store status information for the message; storing a first status in the record; transmitting the message to a destination; and, responsive to receiving an acknowledgement from the destination, storing a second status in the record.

In a further embodiment, a method for reliable message reception includes: providing a memory having one or more memory locations, wherein each memory location being operable to persist a message; receiving a first message from a source; persisting the first message in a first memory location; and, responsive to successfully persisting the first message, transmitting an acknowledgement to the source.

In still a further embodiment, a method for reliable message delivery between a first module and a second module includes: providing a first memory location and a second memory location, the first memory location and second memory location each operable to store a message; providing a message; creating a first persistence of the message in the first memory location, the first persistence being created by the first module; retrieving the message from the first memory location, the message being retrieved by the second module; creating a second persistence of the message in the second memory location, the second persistence being created by the second module; and, responsive to successfully persisting the message in the second memory location, removing the message from the first memory location, the message removal being performed by the second module.

In one embodiment, a system for reliable message delivery includes: means for storing a message; means for associating a first status with the message; means for transmitting the message to a destination; means for receiving an acknowledgement from the destination; and responsive to receiving an acknowledgement from the destination, means for associating a second status with the message.

In another embodiment, a system for reliable message reception includes: means for receiving a first message from a source; means for persisting the first message in a first memory location; and responsive to successfully persisting the first message, means for transmitting an acknowledgement to the source.

In still another embodiment, a computer-readable storage medium has stored thereon computer instructions that, when executed by a computer, cause the computer to: store a message; associate a first status with the message; transmit the message to a destination; receive an acknowledgement from the destination; and responsive to receiving the acknowledgement from the destination, associate a second status with the message.

In yet another embodiment, a computer-readable storage medium has stored thereon computer instructions that, when executed by a computer, cause the computer to: receive a first message from a source; persist the first message in a first memory location; and responsive to successfully persisting the first message, transmit an acknowledgement to the source.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

FIG. 6 illustrates an exemplary registered enterprise table, according to one embodiment.

FIG. 7 illustrates an exemplary onsite enterprise table, according to one embodiment.

DETAILED DESCRIPTION

Figure 1:
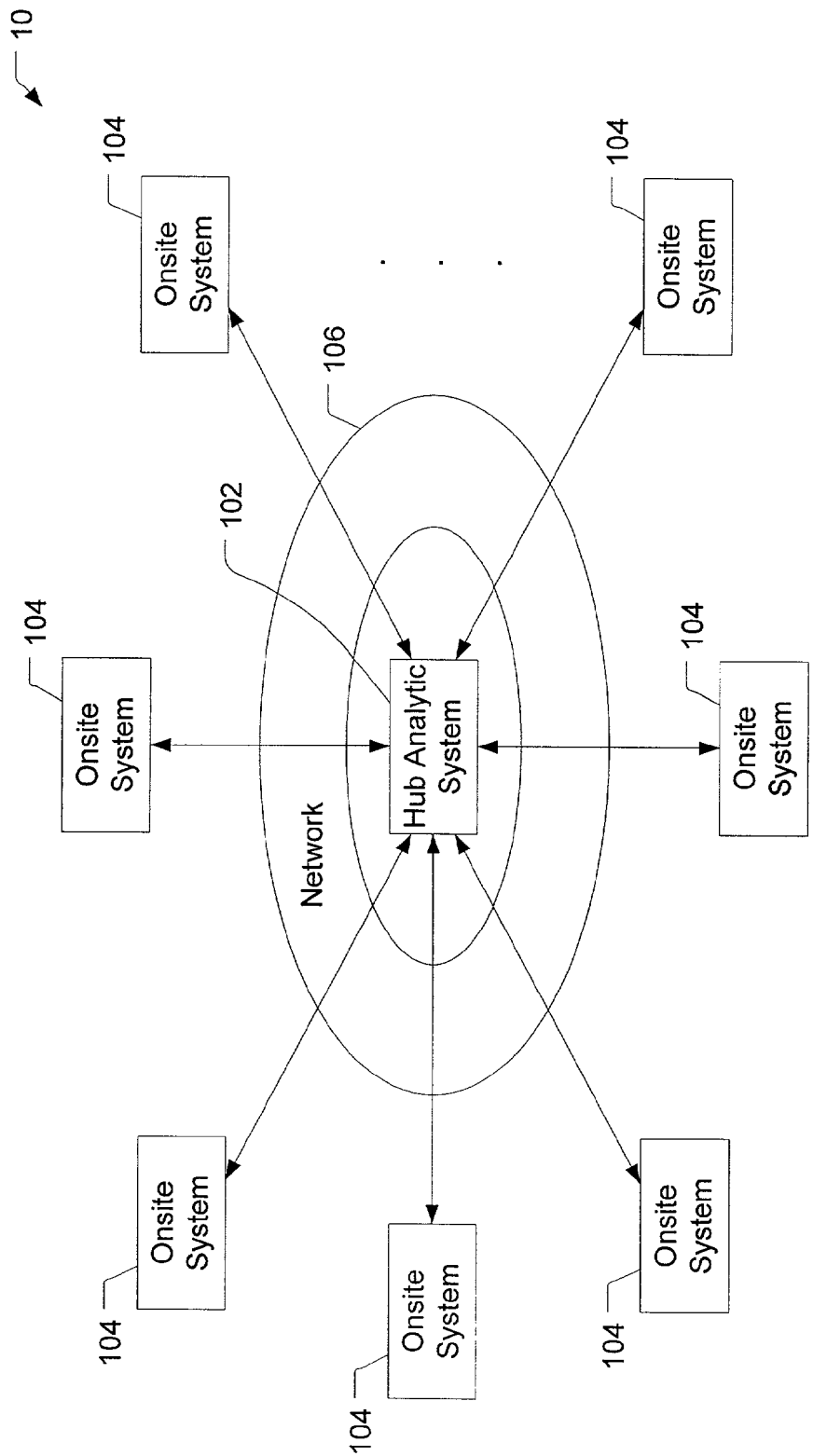
FIG. 1 is a diagram illustrating an environment in which a system of the present invention may operate.

FIG. 1 illustrates an environment in which a system 10 according to one embodiment may operate. As depicted, the environment includes a hub analytic system 102 coupled to one or more onsite systems 104. In particular, hub analytic system 102 and onsite systems 104 are coupled through a network 106. As used herein, the terms "connected,"

"coupled," or any variant thereof, means any connection or coupling, either direct or indirect, between two or more elements; the coupling or connection between the elements can be physical, logical, or a combination thereof.

As used herein, the tetras "hub analytic system" and "onsite system" are to be viewed as designations of one or more computers and are not to be otherwise limiting in any manner. The computers employed as hub analytic system 102 and onsite systems 104 may be the same or different. Hub analytic system 102 may, for example, be comprised of one or more program modules that execute on one or more computers. Each of onsite systems 104 may also be comprised of one or more program modules that execute on one or more computers.

A computer, including the computers comprising hub analytic system 102 and onsite systems 104, may be any microprocessor or processor (hereinafter referred to as processor) controlled device such as, by way of example, personal computers, workstations, servers, clients, mini-computers, mainframe computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker. Additionally, the computer includes memory such as a memory storage device or an addressable storage medium.

The computer may be a uniprocessor or multiprocessor machine. Additionally the computer, and the computer memory, may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as, by way of example, read-only memory (ROM).

Hub analytic system 102 can facilitate reliable communication between onsite systems 104 and hub analytic system 102, as well as reliable communication among onsite systems 104. In one embodiment, the communications between and amongst onsite systems 104 are made via hub analytic system 102, thus creating a "hub-and-spoke" communication architecture. In this communication architecture, hub analytic system 102 functions as the "hub" or "center" through which all communication occurs from and amongst onsite systems 104 situated at the spokes.

Alternatively, the communications between onsite systems 104 and hub analytic system 102 can occur through network 106. Network 106 facilitates the creation of network connections and the transfer and/or transmission of electronic content via the network connections. For example, a network connection created between one of onsite system 104 and hub analytic system 102 functions as a conduit for the transfer of electronic content between the given one of onsite systems 104 and hub analytic system 102.

Network 106 can include the Internet. The Internet is a global network connecting millions of computers, which in the embodiment depicted, includes hub analytic system 102 and onsite systems 104. The structure of the Internet, which is well known to those of ordinary skill in the art, is a global network of computer networks, and utilizes a simple, standard common addressing system and communications protocol known as Transmission Control Protocol/Internet Protocol (TCP/IP).

The Internet facilitates the collection and transfer of interlinked hypertext documents (commonly referred to as "web documents," "web pages," "electronic files" and the like). The web documents are encoded using programming languages, such as, by way of example, Hypertext Markup Language (HTML), Extensible Markup Language (XML), and the like. Standardized Internet protocols, such as, by way of example, Hypertext Transfer Protocol (HTTP), Secure HTTP (S-HTTP), Secure Socket Layer (SSL), and the like. However, the use of future languages and protocols, which may be used in place of, or addition to, HTML, XML, HTTP, S-HTTP, and SSL, are envisioned.

One of ordinary skill in the art will appreciate that the Internet may be comprised of one or a combination of other types of networks without detracting from the scope of the invention. The Internet can include, by way of example, local area networks (LANs), wide area networks (WANs), public internets, private intranets, a private computer network, a secure internet, a private network, a public network, a value-added network, interactive television networks, wireless data transmission networks, two-way cable networks, satellite networks, interactive kiosk networks, and/or any other suitable data network.

In one embodiment, reliable message delivery is achieved through message persistence. A message is persisted as it travels within different components of a computer or from one computer to another computer. "Persistence" or "persisting" here generally refers to storage or storing on non-volatile memory. Non-volatile memory includes memory that retains their contents even when power is lost or tuned off. Examples of non-volatile memory include, without limitation, hard disks, floppy disks, magnetic tapes, compact disks, static ram (e.g., solid state disk, ram disk, etc.), and the like.

For example, one of onsite systems 104 persists a message before transmitting the message to hub analytic system 102. Hub analytic system 102 sends a confirmation to the given one of onsite systems 104 transmitting the message to indicate that the message was received and successfully persisted by hub analytic system 102. If, for any reason a confirmation is not received (e.g., given one of onsite systems 104 or hub analytic system 102 loses power), the given one of onsite systems 104 is able to retransmit the message because given one of onsite system 104 persisted the message (i.e., the given one of onsite systems 104 maintained the message persistence). Thus, message persistence aspect allows for the reliable delivery of messages.

In one embodiment, one of onsite systems 104 associates status information with the message. The status information indicates the need to receive a confirmation indicating successful reception and persistence of the message by the message receiver (i.e., hub analytic system 102). Once a confirmation is received, the given one of onsite systems 104 updates the status information to indicate that the message has been successfully persisted by the receiver and that a retransmission of the message is not necessary. Thus, persisting messages and maintaining status information to indicate the need to retransmit allows for the reliable delivery of messages without excessive or unnecessary message retransmissions.

The aforementioned message persistence, status information, and confirmation aspects also enable reliable transmission of messages from hub analytic system 102 to one of onsite systems 104. Furthermore, because message transmissions between ones of onsite systems 104 occur through hub analytic system 102, messages transmitted from one of onsite systems 104 to another of onsite systems 104 are reliably transmitted. In another embodiment, the message persistence, status information, and confirmation aspects allow for the reliable transmission of messages sent from one of onsite systems 104 to another of onsite systems 104 without going through hub analytic system 102. In this embodiment, the receiving one of onsite systems 104 generally functions as hub analytic system 102 in regard to persisting the transmitted message and sending the confirmation to the sending or transmitting one of onsite systems 102.

"Message" here generally refers to a collection of data and information. For example, a request to perform an action, including the data necessary to perform the action, may be placed in a message by a requestor and transmitted or delivered to a service provider. The service provider may then place the result of the requested action in a message and send the message to the requestor. Thus, a message is analogous to what are generally known as "signals" or data or request packets.

In one embodiment, a message is in the form of an XML document. The contents of a message are in a format that is understood, or capable of being understood, by both sender and receiver (e.g., one of onsite systems 104 and hub analytic system 102). By way of example, message may include information, such as requestor information, type of action requested, any data required from the requestor to perform the requested action, where to send the results, and the like. In another embodiment, the some or all of the contents of the XML document may be encrypted before sending to the recipient. In still other embodiments, a message may be in the form of, for example, a data file, a database record, a sequence of bytes, or any other collection of electronic data.

Figure 2:
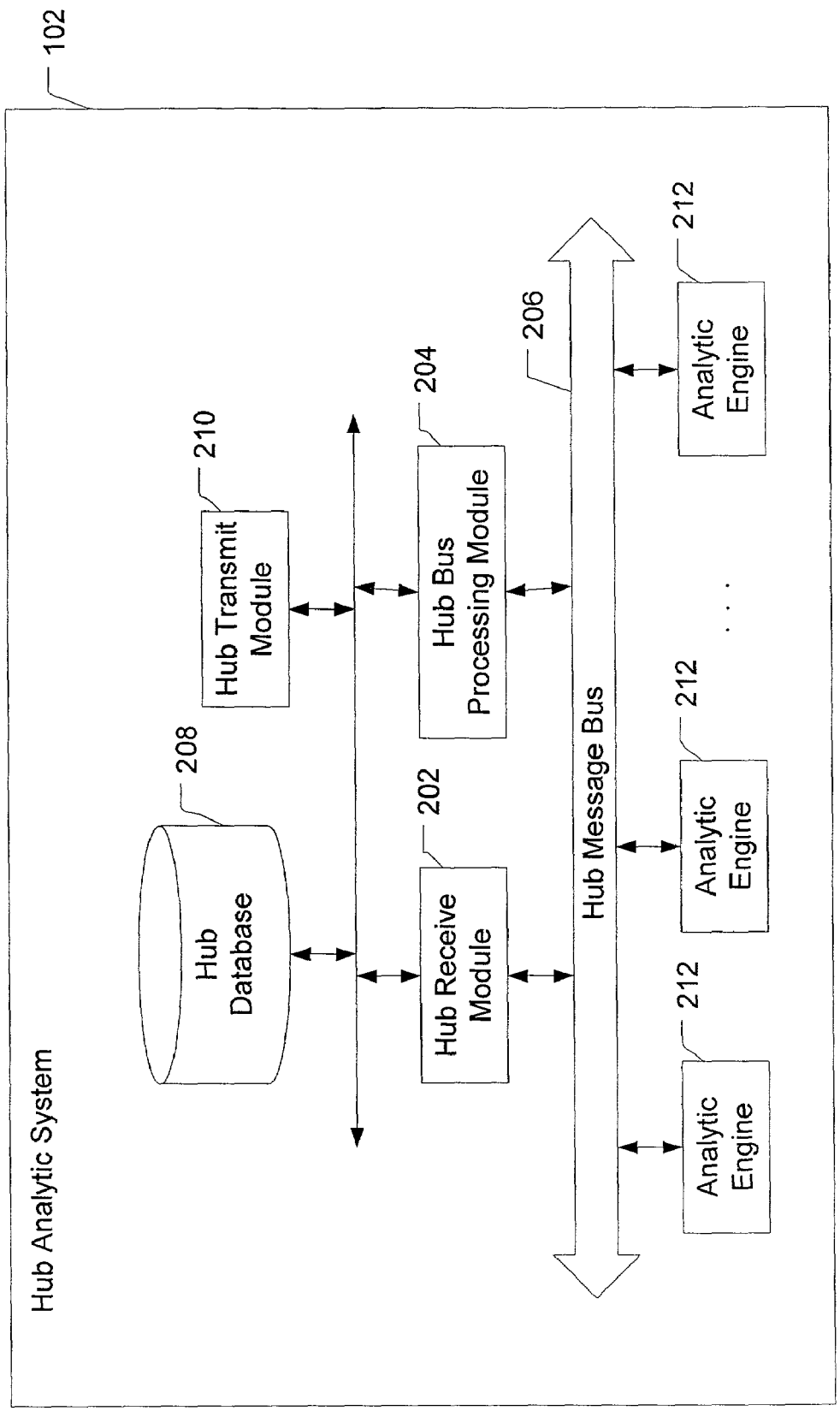
FIG. 2 illustrates exemplary components of a hub analytic system, according to one embodiment.

FIG. 2 illustrates exemplary components of hub analytic system 102, according to one embodiment. As depicted, hub analytic system 102 includes a hub receive module 202, a hub bus processing module 204, a hub message bus 206, a hub database 208, a hub transmit module 210, and one or more analytic engines 212. Hub receive module 202, hub bus processing module 204, and analytic engine(s) 212 are coupled to hub message bus 206. Furthermore, hub receive module 202, hub bus processing module 204, and hub transmit module 210 are coupled to hub database 208.

Hub receive module 202 generally functions to provide connectivity between one or more of onsite systems 104 and hub analytic system 102. In one embodiment, hub receive module 202 facilitates the reception of messages transmitted by one or more of onsite systems 104 over network 106. Hub receive module 202 contains program logic to receive requests to establish network connections over network 106 from onsite systems 104. Hub receive module 202 also contains program logic to receive a message transmitted over the network connection, persist the received message in hub message bus 206, and transmit an acknowledgement over the network connection to indicate the successful persistence of the transmitted message in hub analytic system 102.

Hub bus processing module 204 generally functions to initiate the processing of received messages in hub analytic system 102. Hub bus processing module 204 contains program logic to retrieve a message from hub message bus 206, identify and discard a duplicate message, perform the actions according to the message contents, create an appropriate reply message, persist the reply message in hub database 208, and remove the persistence of the message in hub message bus 206. Hub bus processing module 204 also contains program logic to determine if the message requires processing by another component of hub analytic system 102, and to deliver the message to that component for processing. In one embodiment, hub bus processing module 204 delivers the message to the other components by persisting the message in hub message bus 206.

Hub message bus 206 generally functions to provide message persistence while a message is being processed by hub analytic system 102, and in particular, the components of hub analytic system 102. Hub message bus 206 facilitates the reliable delivery of messages between components of hub analytic system 102. For example, hub receive module 202 can reliably deliver a message to hub bus processing module 204 by persisting the message in hub message bus 206. In one embodiment, hub message bus 206 provides a repository for messages in hub analytic system 102. Hub message bus 206 is implemented in non-volatile memory coupled to hub analytic system 102 to ensure message persistence. Hub message bus 206, and an onsite message bus further described below, can be implemented using any number of commercially available products such as the JAVA Message Service (JMS) defined in the Java 2 Enterprise Edition api's and implemented in the BEA Weblogic Application Server, or the MQSeries message bus from IBM.

In one embodiment, hub message bus 206 may include one or more queues. For example, one queue in hub message bus 206 may be for messages destined for hub bus processing module 204. For example, hub bus processing module 204 retrieves messages from this queue. Another queue in hub message bus 206 may be for messages destined for one or more of analytic engines 212. The one or more of analytic engines 212 retrieve and process messages placed in this queue.

Hub database 208 also functions to provide message persistence for messages in hub analytic system 102. In particular, hub database 208 functions to provide message persistence to messages that are being transmitted by hub analytic system 102. Hub database 208 provides a repository for messages while being transmitted from hub analytic system 102 to, for example, one of onsite systems 104. In one embodiment, hub database 208 is implemented using non-volatile memory coupled to hub analytic system 102, which ensures message persistence.

For example, a message that needs to be delivered to one of onsite systems 104 is persisted in hub database 208. Status information associated with the message indicates that the message needs to be transmitted to the given one of onsite systems 104. During the transmission of the message to the given one of onsite systems 104, and until an acknowledgement indicating that the message has been reliably delivered (e.g., the message has been successfully persisted in the given one of onsite systems 104) is received, the message remains persisted in the onsite database 208. In one embodiment, the status information is updated to indicate reliable delivery of the message and the message remains persisted in hub database 208. In another embodiment, the message may be removed (e.g., no longer persisted in hub database 208) once the message is reliably delivered.

In one embodiment, hub database 208 may be implemented with software written in Structured Query Language (SQL). SQL is a relational database language standard defined by the International Standards Organization (ISO). Hub database 208 can be implemented utilizing any number of commercially available products such as Microsoft Access®, and the like. In another embodiment, hub database 208 may be, by way of example, a relational database, an object oriented database, a hierarchical database, a Lightweight Directory Access Protocol (LDAP) directory, an object oriented-relational database, and the like. In still another embodiment, hub database 208 may conform to any other database standard, or may even conform to a non-standard, private specification. In yet another embodiment, hub database 208 may be implemented using a file system provided with an operating system executing on the computer.

Hub transmit module 210 generally functions to provide connectivity between hub analytic system 102 and one or more of onsite systems 104. In one embodiment, hub transmit module 210 facilitates the delivery or transmission of messages to given one of onsite systems 104 over network 106. Hub transmit module 210 contains program logic to retrieve a message from hub database 208, identify one of onsite systems 104 that is to receive the message, establish a network connection to the given one of onsite systems 104, and transmit the message using the network connection to the given one of onsite systems 104. Hub transmit module 210 also contains program logic to maintain the network connection until an acknowledgement from the given one of onsite systems 104 is received or until a predetermined timeout value expires. If an acknowledgement is received, hub transmit module 210 updates status information associated with the message to indicate that the message was reliably delivered.

In one embodiment, hub transmit module 210 requests a secure network connection, such as, by way of example, an S-HTTP connection, an SSL connection, and the like, to onsite system 104. Hub transmit module 210 may then use the authentication and/or encryption functions provided by the secure network connection to reliably and securely transmit the message to onsite system 104. For example, hub transmit module 210 can encrypt all or a portion of the message before transmitting the message to onsite system 104.

Analytic engines 212 generally function to provide one or more computing services to onsite systems 104. Analytic engines 212 may provide computing services such as, by way of example, email services, document services, financial analysis, marketing analysis, product or service forecasting, banking services, financial services, e-commerce services, and any other service that may be implemented on and provided through one or more computers. Analytic engines 212 contain program logic to retrieve a message from, for example, a queue in hub message bus 206, perform the actions according to the message contents and the service or services provided by analytic engines 212, persist a replay message in hub message bus 206, and remove the message from hub message bus 206.

In one embodiment, each analytic engine 212 has a queue in hub message bus 206. For example, a message requesting email services is placed in a queue in hub message bus 206 that is monitored by an analytic engine 212 that provides the email services. A message requesting financial services is placed in another queue in hub message bus 206 that is monitored by an analytic engine 212 that provides the financial services. Persisting messages in queues based on the service or services requested and provided by analytic engines 212 enables efficient and reliable delivery of messages to the appropriate analytic engine 212.

Those of ordinary skill in the art will appreciate that the functionality provided by the components, modules, and databases of hub analytic system 102, as well as onsite systems 104, may be combined into fewer components, modules, or databases, or further separated into additional components, modules, and databases. Additionally, the components, modules, and databases may be implemented on one or more computers.

Figure 3:
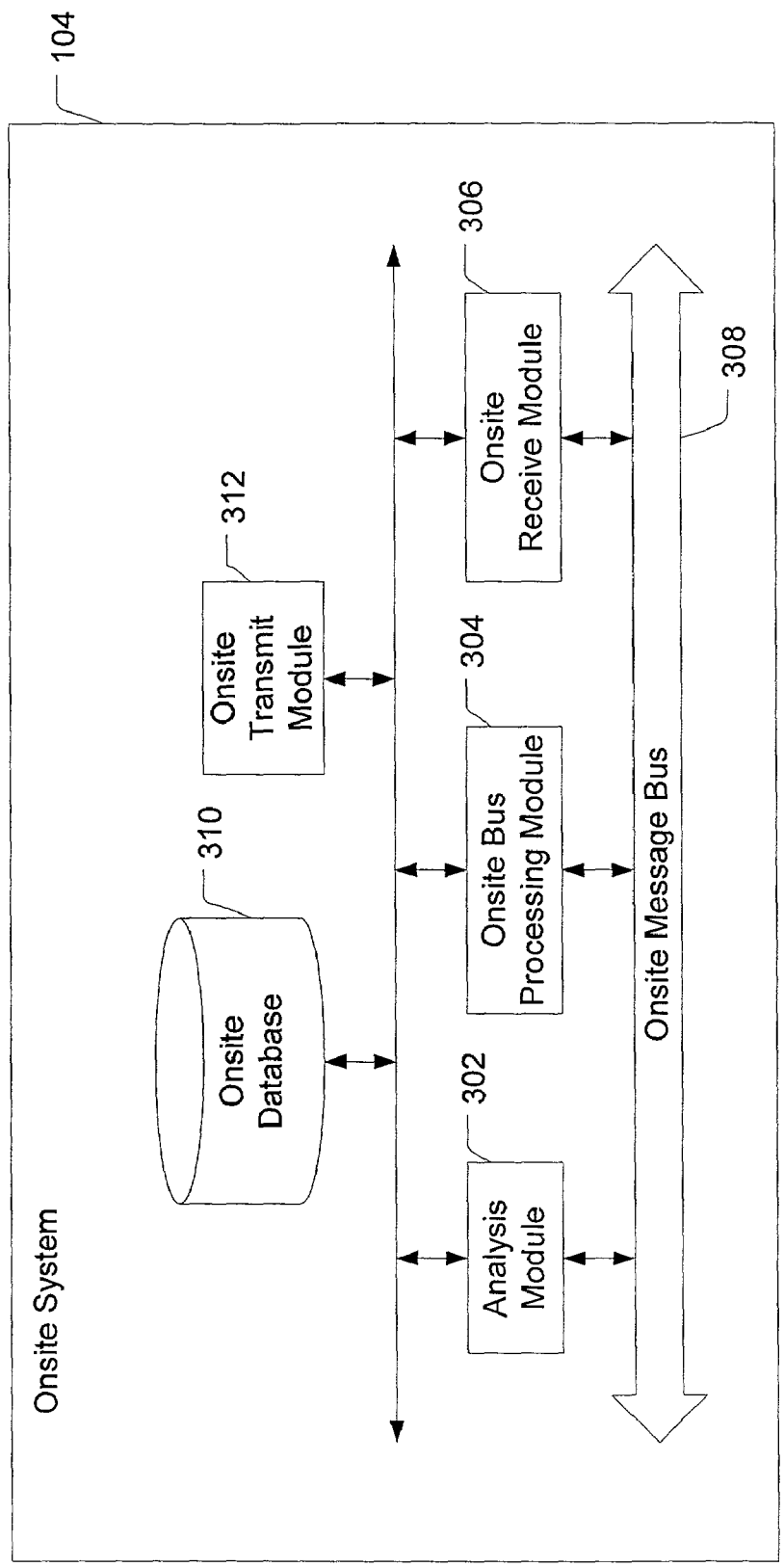
FIG. 3 illustrates exemplary components of an onsite system, according to one embodiment.

FIG. 3 illustrates exemplary components of an onsite system 104, according to one embodiment. As depicted, onsite system 104 includes an analysis module 302, an onsite bus processing module 304, an onsite receive module 306, an onsite message bus 308, an onsite database 310, and an onsite transmit module 312. Analysis module 302, onsite bus processing module 304, and onsite receive module 306 are coupled to onsite message bus 308. Furthermore, analysis module 302, onsite bus processing module 304, onsite receive module 306, and onsite transmit module 312 are coupled to onsite database 310.

Analysis module 302 generally functions to create messages based on requests made by users. In one embodiment, analysis module 302 supports an interface (e.g., a user interface, an application interface, and the like) through which a user can access the services and functions provided on onsite systems 104 and hub analytic system 102. Analysis module 302 contains program logic to receive and process data input by a user through the user interface, to create a message from the input user data, persist the message in the database, and to prepare the message for transmission to the destination (e.g., hub analytic system 102). Analysis module 302 also contains program logic to determine if the data input by the user requires creating a collaborative message. A collaborative message is a message that is addressed to one or more other onsite systems 104. If a collaborative message is required, analysis module 302 creates and persists the necessary point-to-point messages, where a point-to-point message is a message from one onsite system 104 to another onsite system 104.

In general terms, onsite bus processing module 304 processes the messages received by onsite system 104. The messages may have been sent, for example, by another onsite system 104 or hub analytic system 102. Onsite bus processing module 304 contains program logic to retrieve a message from onsite message bus 308, identify and discard a duplicate message, persist the message in onsite database 310, and remove the persistence of the message in onsite message bus 308. Onsite bus processing module 304 also contains program logic to parse the contents of the message and to perform the actions according to the message contents.

Onsite receive module 306 generally functions to provide connectivity between hub analytic system 102 and onsite system 104. In one embodiment, onsite receive module 306 facilitates the reception of messages transmitted by hub analytic system 102 over network 106. Onsite receive module 306 contains program logic to receive a request from hub analytic system 102 to create a network connection over network 106. The onsite receive module 304 also contains program logic to receive a message transmitted over the network connection, persist the received message in onsite message bus 308, and transmit an acknowledgement over the network connection to indicate the successful persistence of the transmitted message in onsite system 104.

Onsite message bus 308 generally functions to provide message persistence while a message is being processed by onsite system 104, and in particular, the components of onsite system 104. Onsite message bus 308 facilitates the reliable delivery of messages between components of onsite system 104. For example, onsite receive module 306 can reliably deliver a message to onsite bus processing module 304 by persisting the message in onsite message bus 308. In one embodiment, onsite message bus 308 provides a repository for messages in onsite system 104. Onsite message bus 308 is implemented in non-volatile memory coupled to onsite system 104 to ensure message persistence.

Onsite database 310 also functions to provide message persistence for messages in onsite system 104. Onsite database 310 provides a repository for messages created by onsite system 104 and messages received and processed by onsite system 104. In one embodiment, onsite database 310 is implemented using non-volatile memory coupled to onsite system 104, which ensures message persistence. Alternatively, onsite database 310 may be implemented in a manner similar to aforementioned hub database 208.

For example, a message that needs to be transmitted by onsite system 104 is persisted in onsite database 310. A status information associated with the message indicates that the message needs to be transmitted to hub analytic system 102. During the transmission of the message to hub analytic system 102, and until an acknowledgement that indicates that the message has been reliably delivered (e.g., the message has been successfully persisted in hub analytic system 102) is received, the message remains persisted in onsite database 310. If for some reason the message delivery resulted in an error condition, the message can be retransmitted until reliably delivered because of the message persistence in onsite database 310. As another example, onsite system 104 may persist a received message (e.g., a message sent by another onsite system 104 or a message sent by hub analytic system 102) in onsite database 310, thus enabling one or more components of onsite system 104 to accordingly process the message.

Onsite transmit module 312 generally functions to provide connectivity between onsite system 104 and hub analytic system 102. In one embodiment, onsite transmit module 312 facilitates the delivery or transmission of messages to hub analytic system 102 over network 106. Onsite transmit module 312 contains program logic to retrieve a message from onsite database 310, establish a network connection to hub analytic system 102, and transmit the message using the network connection to hub analytic system 102. Onsite transmit module 312 also contains program logic to maintain the network connection until an acknowledgement from hub analytic system 102 is received or until a predetermined timeout value expires. If an acknowledgement is received, onsite transmit module 312 updates status information associated with the message to indicate that the message was reliably delivered. In one embodiment, onsite transmit module 312 requests a secure network connection to hub analytic system 102.

Figure 4:
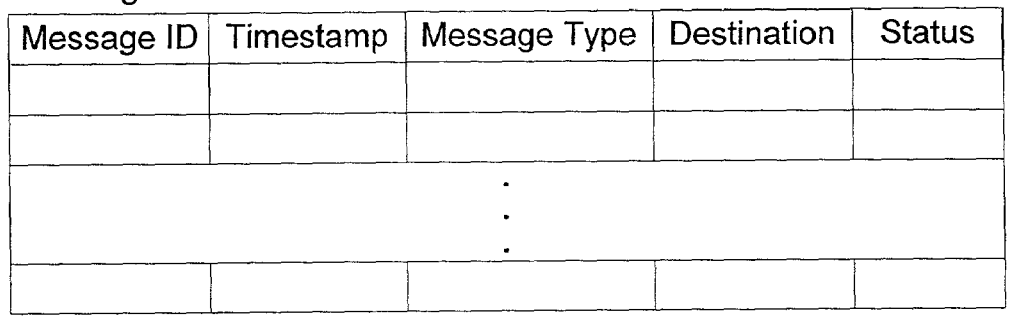
FIG. 4 illustrates an exemplary message header table, according to one embodiment.

FIG. 4 illustrates an exemplary message header table 402, according to one embodiment. Message header table 402 can be maintained by an onsite systems 104 and contains one or more message header records. Message header table 402 and message data table 502 (FIG. 5) are used to persist the messages sent from onsite system 104 to hub analytic system 102 so as to later verify their receipt by hub analytic system 102. In another embodiment, the tables 402 and 502 may be used to manage and persist the messages received by onsite system 104.

A message header record contains header or control information of a corresponding message. By way of example, five fields are illustrated comprising a message ID, a timestamp, a message type, a destination, and a status. The message ID field contains a message identifier that uniquely identifies a message. The timestamp field contains a time that the corresponding message was created. In another embodiment, the timestamp field can contain a time that the corresponding message header record was created in message header table 402.

The message type field contains, for example, a descriptor or an identifier that indicates the type of message. Examples of types of messages include, without limitation, request message, reply message, metering information message, independent message, and collaborative message. "Independent message" here generally refers to a message directed purely to hub analytic system 102 (e.g., the ultimate destination of an independent message is hub analytic system 102). In contrast, "collaborative message" here generally refers to a message directed to one or more other onsite systems 104 (e.g., the ultimate destination of a collaborative message is another onsite system 104). Collaborative messages reach their ultimate destination through hub analytic system 102.

The destination field contains an address or identifier of the recipient (e.g., hub analytic system 102 or onsite system 104) of the message. The status field contains an indication of the status of the message. In one embodiment, the status may be, by way of example, "waiting," "sent," or "acknowledged." A status of waiting indicates that the message is waiting to be transmitted or delivered to the destination, as indicated in the destination field. A status of sent indicates that the message has been transmitted to the destination. A status of acknowledged indicates that the message has been acknowledged, for example, by hub analytic system 102.

Figure 5:
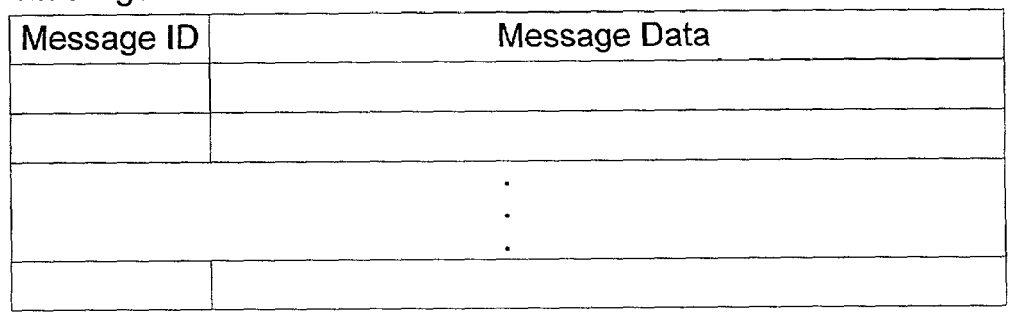
FIG. 5 illustrates an exemplary message data table, according to one embodiment.

FIG. 5 illustrates an exemplary message data table 502, according to one embodiment. Message data table 502 can be maintained by an onsite system 104 and contains one or more message data records. Message data table 502 is used to persist the messages in onsite systems 104. A message data record contains the data portion or component of a corresponding message. By way of example, two fields are illustrated comprising a message ID and a message data. The message ID field contains a message identifier that uniquely identifies a message. The message identifier may be used to identify the corresponding message header record. The message data field contains the data portion or component of the message.

In one embodiment, hub analytic system 102 can also maintain message header table 402 and message data table 502, for example, in hub database 208. The tables 402 and 502 can be used by the components of hub analytic system 102 to persist messages in hub analytic system 102.

FIG. 6 illustrates an exemplary registered enterprise table 602, according to one embodiment. Registered enterprise table 602 is administered by hub analytic system 102 and contains one or more registered enterprise records. In one embodiment, an enterprise is the user or operator of one or more onsite systems 104. An enterprise needs to register its onsite systems 104 with hub analytic system 102 before using the services provided by hub analytic system 102. Registered enterprise table 602 is used to maintain a list of the enterprises or onsite systems 104 that are registered with hub analytic system 102.

A registered enterprise record contains information to identify a registered onsite system 104. By way of example, two fields are illustrated comprising an enterprise ID and a destination. The enterprise ID field contains an identifier that uniquely identifies onsite system 104. In one embodiment, the identifier in the enterprise ID field may be used in the destination field of the message header record to identify the recipient (e.g., onsite system 104) of the message. The destination field contains an address of the corresponding onsite system 104. The destination field may contain an indicator or identifier that can be used to determine the address or location of the corresponding onsite system 104.

FIG. 7 illustrates an exemplary onsite enterprise table 702, according to one embodiment. An onsite system 104 maintains a list of allowable destinations (e.g., other enterprises or onsite systems 104) in an onsite enterprise table 702. Onsite system 104 is permitted to communicate with the enterprises or onsite systems 104 that are listed in the list of allowable destinations. Onsite enterprise table 702 contains one or more onsite enterprise records. Each onsite enterprise record identifies an onsite system 104 in a manner similar to the aforementioned registered enterprise record in registered enterprise table 602 above.

In one embodiment, the list of allowable destinations (e.g., the onsite enterprise records contained in onsite enterprise table 702) is a subset of the registered enterprises or onsite systems 104 (e.g., the registered enterprise records contained in registered enterprise table 602). Onsite system 104 may contain program logic to periodically update its onsite enterprise table 702 from hub analytic system 102. Hub analytic system 102 may maintain data and information to determine each onsite system's 104 allowable destinations. Hub analytic system 102 can then provide each onsite system 104 with a list of the onsite system's 104 allowable destinations.

For example, a corporation may be operating ten onsite systems 104. Furthermore, the corporation may only want its onsite systems 104 to be able to communicate with each other and not with other ones of onsite systems 104. Specifying the allowable destinations enables the corporation, for example, to protect its sensitive data by controlling external access to its onsite systems 104. Here, onsite enterprise table 702 for each of the ten onsite systems 104 operated by the company will list the other nine onsite systems 104 operated by the company. Other onsite systems 104 not operated by the company is not listed in onsite enterprise table 702 as an allowable destination.

Figure 8:
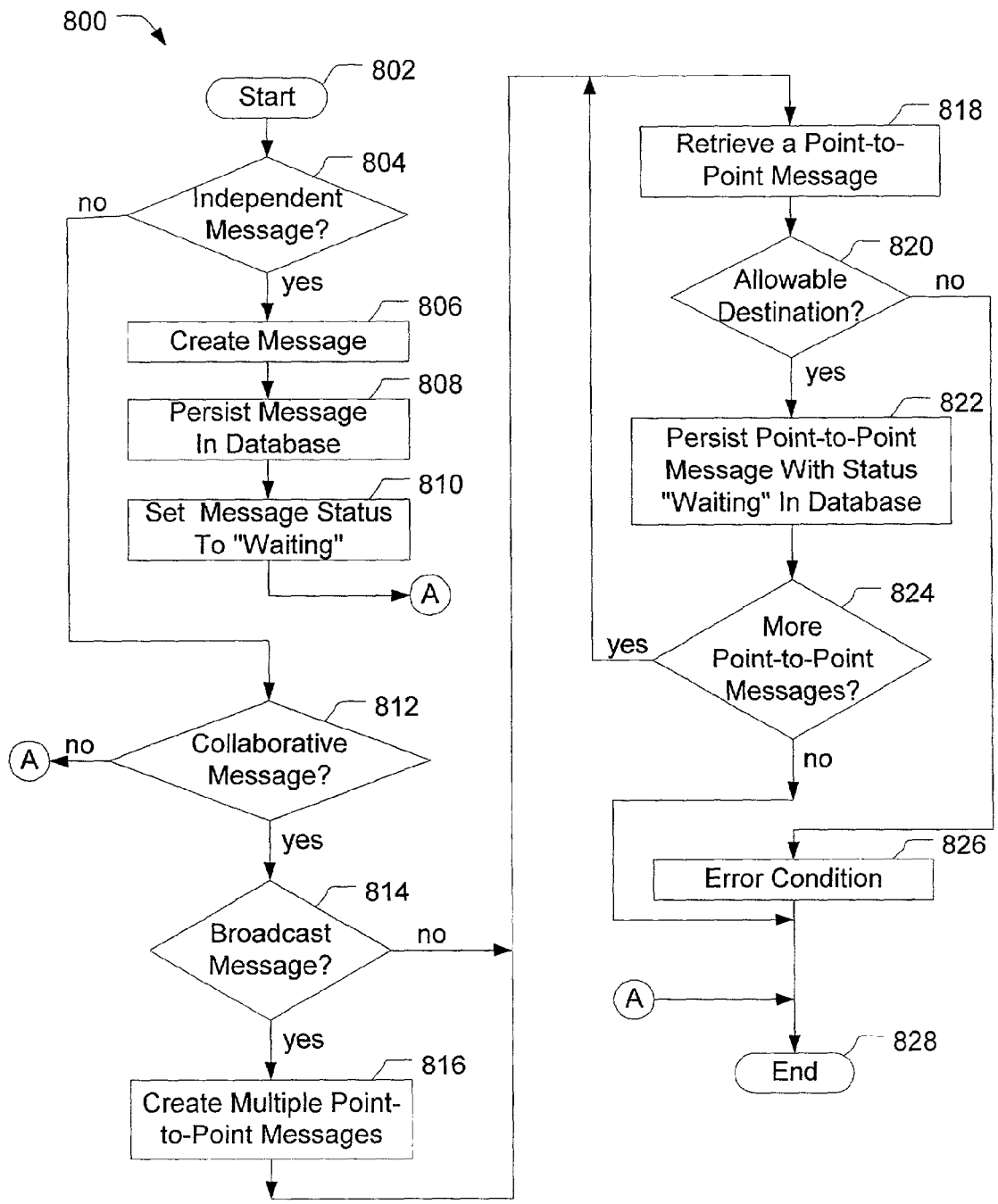
FIG. 8 illustrates a flow chart of an exemplary method by which an onsite analysis module processes a message, in accordance with one embodiment of the present invention.

FIG. 8 illustrates a flow chart of an exemplary method 800 by which analysis module 302 processes a message, in accordance with one embodiment of the present invention. Beginning at a start step 802, a user employs, for example, a user interface to submit a request on onsite system 104. For example, the user, through one or more user interfaces, submits a request to perform a desired action. Analysis module 302 receives the user request and the data and information submitted by the user.

At step 804, analysis module 302 determines the type of request submitted by the user. In particular, analysis module 302 determines, from the requested action and/or the data and information submitted by the user, if the creation of an independent message (e.g., a message destined for hub analytic system 102) or a collaborative message (e.g., a message destined for one or more onsite systems 104) is required.

If, at step 804, analysis module 302 determines that an action requiring an independent message was requested, analysis module 302 creates an independent message at step 806. In one embodiment, the independent message is a markup language file (e.g., an XML file) that contains the data and information received from the user and necessary to request the action at hub analytic system 102. At step 808, analysis module 302 persists the created message in onsite database 310. Analysis module 302 creates a message header record in message header table 402 and a message data record in message data table 502 for the created message. At step 810, analysis module 302 sets the status field in the message header record for the persisted message to "waiting" to indicate that the independent message is ready to be transmitted to hub analytic system 102, and method 800 ends at step 828.

If, at step 804, analysis module 302 determines that an action requiring an independent message was not requested, analysis module 302 determines if an action requiring a collaborative message was requested at step 812. If a collaborative message is not required, analysis module 302 ends processing at step 828. For example, analysis module 302 may not have received the information and data necessary to process the user's request. In one embodiment, analysis module 302 may record the error condition by, for example, displaying an error message to the user, logging the error in a log file, triggering an alarm, and the like.

If, at step 812, analysis module 302 determines that an action requiring a collaborative message was requested, analysis module 302 determines if a broadcast collaborative message was requested at step 814. A broadcast collaborative message is a collaborative message to more than one destination (e.g., onsite system 104). For example, the user may have requested that onsite system 104 deliver to two other onsite systems 104 the data input specified by the user. If a broadcast collaborative message is not required, analysis module 302 creates a point-to-point message (e.g., a collaborative message to a single onsite system 104).

If an action requiring a broadcast collaborative message was requested, analysis module 302 creates the necessary point-to-point messages at step 816. For example, a point-to-point message is created for each of onsite systems 104 that is to receive the collaborative message. At step 818, analysis module 302 retrieves a point-to-point message that was created and determines if the point-to-point message is destined to an allowable destination at step 820. Analysis module 302 checks onsite enterprise table 702 to ensure that the intended recipient (e.g., onsite system 104) is listed as an allowable destination in onsite enterprise table 702. If the intended recipient is not an allowable destination, then, at step 826, analysis module 302 records the error condition and method 800 ends at step 828. In another embodiment, analysis module 302 may record the error condition at step 826, discard or log the point-to-point message, and continue processing the remaining point-to-point messages.

If, at step 820, the analysis module determines that the point-to-point message is destined for an allowable destination, analysis module 302 persists the point-to-point message in onsite database 310. Analysis module 302 creates a message header record in message header table 402 and a message data record in message data table 502 for the point-to-point message. Analysis module 302 sets the status field in the message header record for the persisted point-to-point message to "waiting" to indicate that the point-to-point message is ready to be transmitted, for example, to hub analytic system 102.

At step 824, analysis module 302 determines if there are more point-to-point messages to process. If there are more point-to-point messages to process, analysis module 302 retrieves the next point-to-point message at step 818, and continues processing the retrieved point-to-point message (steps 820 and 822). If, at step 824, analysis module 302 determines that there are no more point-to-point messages to process (e.g., all the point-to-point messages have been processed), analysis module 302 ends processing at step 828.

Those of ordinary skill in the art will appreciate that, for this and other methods disclosed herein, the functions performed in the exemplary flow charts may be implemented in differing order. Furthermore, the steps outlined in the flow charts are only exemplary, and some of the steps may be optional, combined into fewer steps, or expanded into additional steps without detracting from the essence of the invention.

Figure 9:
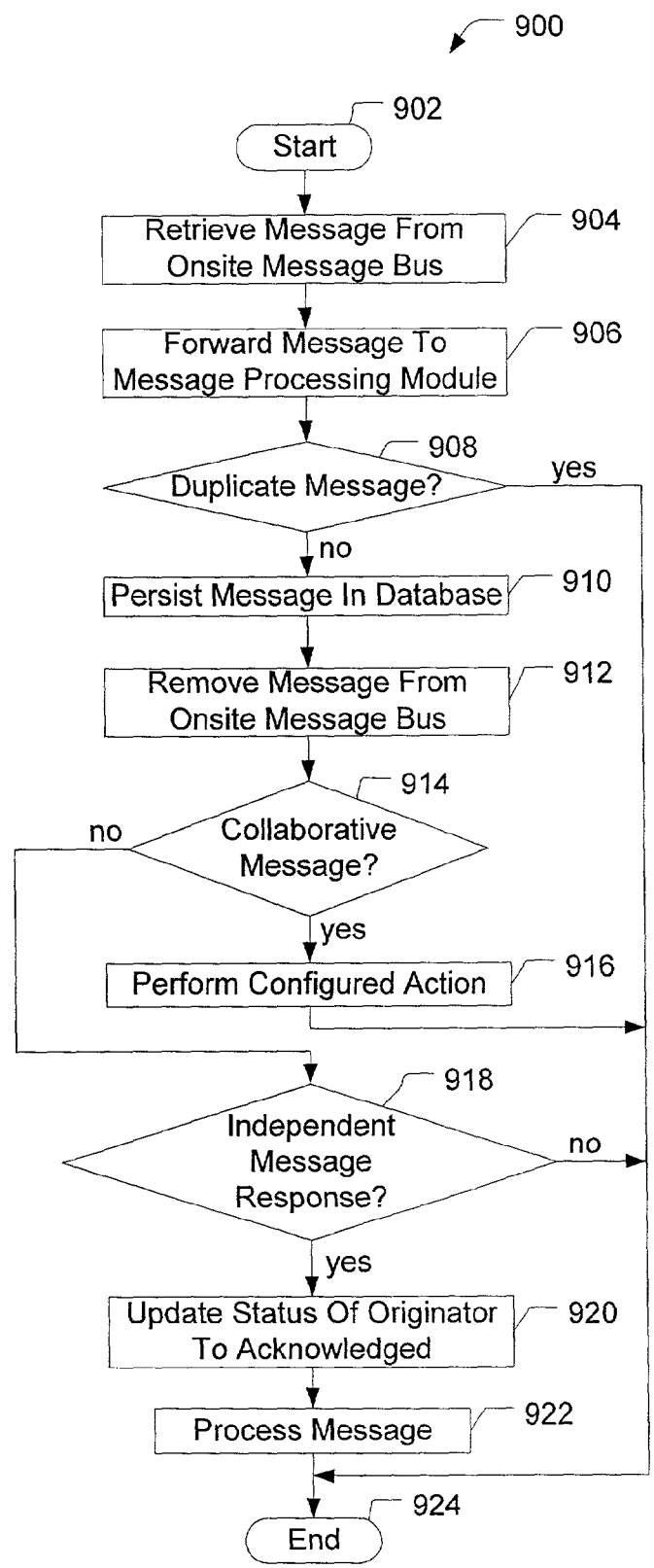
FIG. 9 illustrates a flow chart of an exemplary method by which an onsite bus processing module processes a received message, in accordance with one embodiment of the present invention.

FIG. 9 illustrates a flow chart of an exemplary method 900 by which onsite bus processing module 304 processes a received message, in accordance with one embodiment of the present invention. Beginning at a start step 902, a software process executing in onsite system 104 determines that a message in onsite message bus 308 requires processing. For example, onsite receive module 306 may have received a message from hub analytic system 102 and persisted the received message in onsite message bus 308.

At step 904, the software process retrieves the message to process from onsite message bus 308. In one embodiment, the software module retrieves a copy of the message, and the message remains persisted in onsite message bus 308. Maintaining the message persistence ensures that the message can be recovered or retrieved in case the retrieved message is lost or damaged (e.g., onsite system 104 crashes or the software process crashes). At step 906, the software process forwards the retrieved message to onsite bus processing module 304 for processing. Those of ordinary skill in the art will realize that onsite bus processing module 304 could have retrieved the message from onsite message bus 308.

At step 908, onsite bus processing module 304 determines if the message is a duplicate message. In one embodiment, onsite bus processing module 304 maintains, for example, a list of message IDs for the messages that it has processed. Onsite bus processing module 304 can then determine from the list if the message is a message it has already processed (i.e., a duplicate message). For example, a duplicate message can occur if onsite system 104, and in particular, onsite receive module 306 received and persisted the message in onsite message bus 308, but was unable to send an acknowledgement to the sending hub analytic system 102 (e.g., onsite system 104 crashed before the acknowledgement could be sent). In another example, hub analytic system 102 may have transmitted the message and crashed before receiving an acknowledgement. In both instances, hub analytic system 102 may have retransmitted the message once it came back up.

If, at step 908, onsite bus processing module 304 determines that the message is a duplicate message, onsite bus processing module 304 ends processing at step 924. In one embodiment, onsite bus processing module 304 may remove the message from onsite message bus 308. Thus, the message is no longer persisted in onsite message bus 308.

If, at step 908, onsite bus processing module 304 determines that the message is not a duplicate message, onsite bus processing module 304 persists the message in onsite database 310 at step 910. In one embodiment, onsite bus processing module 304 creates a message header record in message header table 402 and a message data record in message data table 502 for the message. At step 912, onsite bus processing module 304 removes the message persistence in onsite message bus 308. Even though the message is removed from onsite message bus 308, the message is still persisted in onsite database 310.

At step 914, onsite bus processing module 304 determines if the message is a collaborative message originally sent by another onsite system 104. If it is a collaborative message, onsite bus processing module 304 performs the action requested in the message, and method 900 ends at step 924. For example, the message may have been a request to obtain a file stored on onsite system 104. Onsite bus processing module 304 can then retrieve the requested file and submit a request to, for example, analysis module 302 to send the requested file to the requesting onsite system 104.

If, at step 914, onsite bus processing module 304 determines that the message is not a collaborative message, onsite bus processing module 304, at step 918, determines if the message is a response (e.g., a reply message from hub analytic system 102) to a prior independent message sent by onsite system 104. For example, assuming that onsite system 104 previously sent a message to hub analytic system 102 requesting an analysis to be performed, this message may be a reply message containing the results of the previously requested analysis. If, at step 918, the message is a response message from hub analytic system 102, onsite bus processing module 304 updates the status of the original independent message (i.e., the previous message sent by onsite system 104 to which the current message is a reply) to "acknowledged" at step 920. In one embodiment, onsite bus processing module 304 updates the status field in the message header record corresponding to the previously sent independent message to "acknowledged."

At step 922, onsite bus processing module 304 further processes the message as necessary. For example, onsite bus processing module 304 may display the message contents indicating the results of the previously requested action on a user interface. In another example, onsite bus processing module 304 may log the results in a results file. Having processed the message, onsite bus processing module 304 ends processing at step 924.

Figure 10:
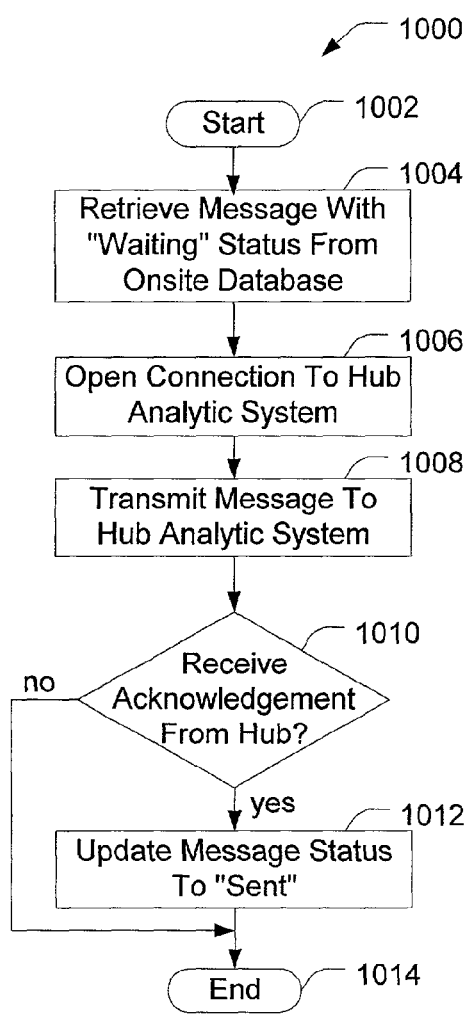
FIG. 10 illustrates a flow chart of an exemplary method by which an onsite transmit module transmits a message, in accordance with one embodiment of the present invention.

FIG. 10 illustrates a flow chart of an exemplary method 1000 by which onsite transmit module 312 transmits a message, in accordance with one embodiment of the present invention. Beginning at a start step 1002, a message requiring delivery to hub analytic system 102 is persisted in onsite database 310. For example, analysis module 302 may have persisted an independent message or a point-to-point collaborative message in onsite database 310, and set the status in the corresponding message header record to "waiting" to indicate that the message requires delivery.

At step 1004, onsite transmit module 312 retrieves the message with a "waiting" status from onsite database 310. In one embodiment, the message remains persisted in onsite database 310 and onsite transmit module 312 retrieves a copy of the message from onsite database 310. At step 1006, onsite transmit module 312 requests a network connection, for example, over network 106 to hub analytic system 102. Onsite transmit module 312 may request a secure network connection (e.g., SSL, S-HTTP, and the like) to hub analytic system 102.

At step 1008, onsite transmit module 312 transmits the message to hub analytic system 102 over the established network connection. At step 1010, onsite transmit module 312 waits to receive an acknowledgement from hub analytic system 102. The acknowledgement indicates that the transmitted message has been successfully persisted by the recipient or the receiving node. In one embodiment, the acknowledgement is received over the same network connection. In another embodiment, the acknowledgement may be received over a different network connection.

If, at step 1010, an acknowledgement is not received within a predetermined time period (e.g., a timeout), onsite transmit module 312 ends processing at step 1014. Onsite transmit module 312 can subsequently retransmit the message to hub analytic system 102 because the message remains persisted in onsite database 310 with a status of "waiting." If, at step 1010, an acknowledgement is received, onsite transmit module 312, at step 1012, updates the status in the message header record corresponding to the message to "sent," and method 1000 ends at step 1014. Updating the status to "sent" indicates that an acknowledgement was received and that the message need not be retransmitted to hub analytic system 102. The reliably delivered message can remain persisted in onsite database 310. In another embodiment, reliably delivered messages may be removed or purged from onsite database 310.

Figure 11:
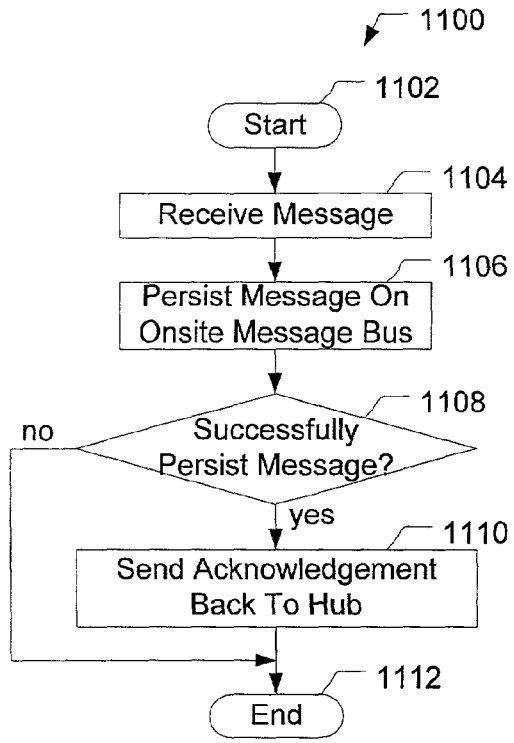
FIG. 11 illustrates a flow chart of an exemplary method by which an onsite receive module receives a message, in accordance with one embodiment of the present invention.

FIG. 11 illustrates a flow chart of an exemplary method 1100 by which onsite receive module 306 receives a message, in accordance with one embodiment of the present invention. Beginning at a start step 1102, onsite receive module 306 receives a request to establish a network connection, for example, over network 106, from hub analytic system 102. Onsite receive module 306 responds by creating the requested network connection. At step 1104, onsite receive module 306 receives the message transmitted over the network connection by hub analytic system 102. At step 1106, onsite receive module 306 persists the received message in onsite message bus 308.

At step 1108, onsite receive module 306 checks to determine onsite message bus 308 successfully persists the message. Error may occur while persisting the message in onsite message bus 308. For example, if onsite message bus 308 is implemented using a database program, the database program may encounter error conditions while storing or persisting the message and the persisting function may thus fail. If the message is not successfully persisted in onsite message bus 308, onsite receive module 306 ends processing at step 1112. In this instance, an acknowledgement is not sent to hub analytic system 102. In another embodiment, onsite receive module 306 may send a NAK to hub analytic system 102.

If, at step 1108, onsite receive module 306 determines that the message is successfully persisted in onsite message bus 308, onsite receive module 306 transmits an acknowledgement to hub analytic system 102 at step 1110. In one embodiment, onsite receive module 306 sends the acknowledgement via the same network connection used to receive the message from hub analytic system 102. The acknowledgement is an indication that the message has been successfully persisted in onsite system 104, and thus, can be recovered. Because the message is persisted and recoverable, the message is successfully delivered. Having sent the acknowledgement to hub analytic system 102, onsite receive module 306 ends processing at step 1112.

Figure 12:
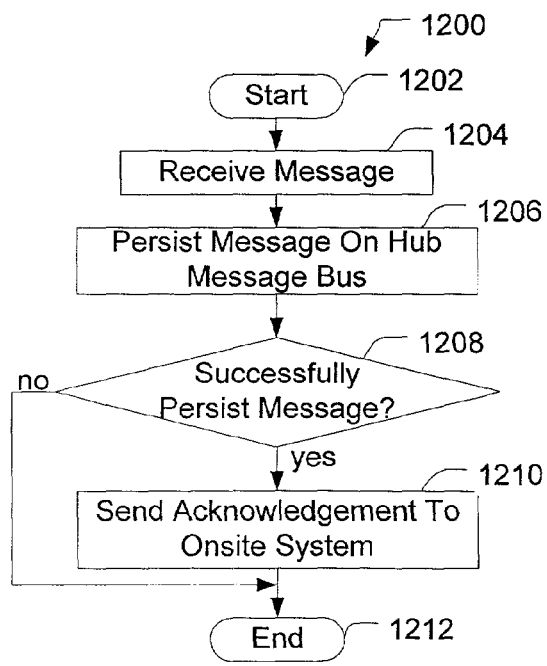
FIG. 12 illustrates a flow chart of an exemplary method by which a hub receive module receives a message, in accordance with one embodiment of the present invention.

FIG. 12 illustrates a flow chart of an exemplary method 1200 by which hub receive module 202 receives a message, in accordance with one embodiment of the present invention. Beginning at a start step 1202, hub receive module 202 receives a request to establish a network connection, for example, over network 106, from an onsite system 104. Hub receive module 202 responds by creating the requested network connection. At step 1204, hub receive module 202 receives the message transmitted over the network connection by onsite system 104. At step 1206, hub receive module 202 persists the received message in hub message bus 206.

At step 1208, hub receive module 202 checks to determine if hub message bus 206 successfully persists the message. Errors may occur while persisting the message in hub message bus 206. For example, if hub message bus 206 is implemented using a file system, the file system may encounter error conditions while storing or persisting the message and the persisting function may thus fail. If the message is not successfully persisted in hub message bus 206, hub receive module 202 ends processing at step 1212. In this instance, an acknowledgement is not sent to onsite system 104.

If, at step 1208, hub receive module 202 determines that the message is successfully persisted in hub message bus 206, hub receive module 202 transmits an acknowledgement to onsite system 104 at step 1210. In one embodiment, hub receive module 202 sends the acknowledgement via the same network connection used to receive the message from onsite system 104. The acknowledgement is an indication that the message has been successfully persisted in hub analytic system 102, and thus, can be recovered. Because the message is persisted and recoverable, the message is successfully delivered. Having sent the acknowledgement to onsite system 104, hub receive module 202 ends processing at step 1212.

Figure 13:
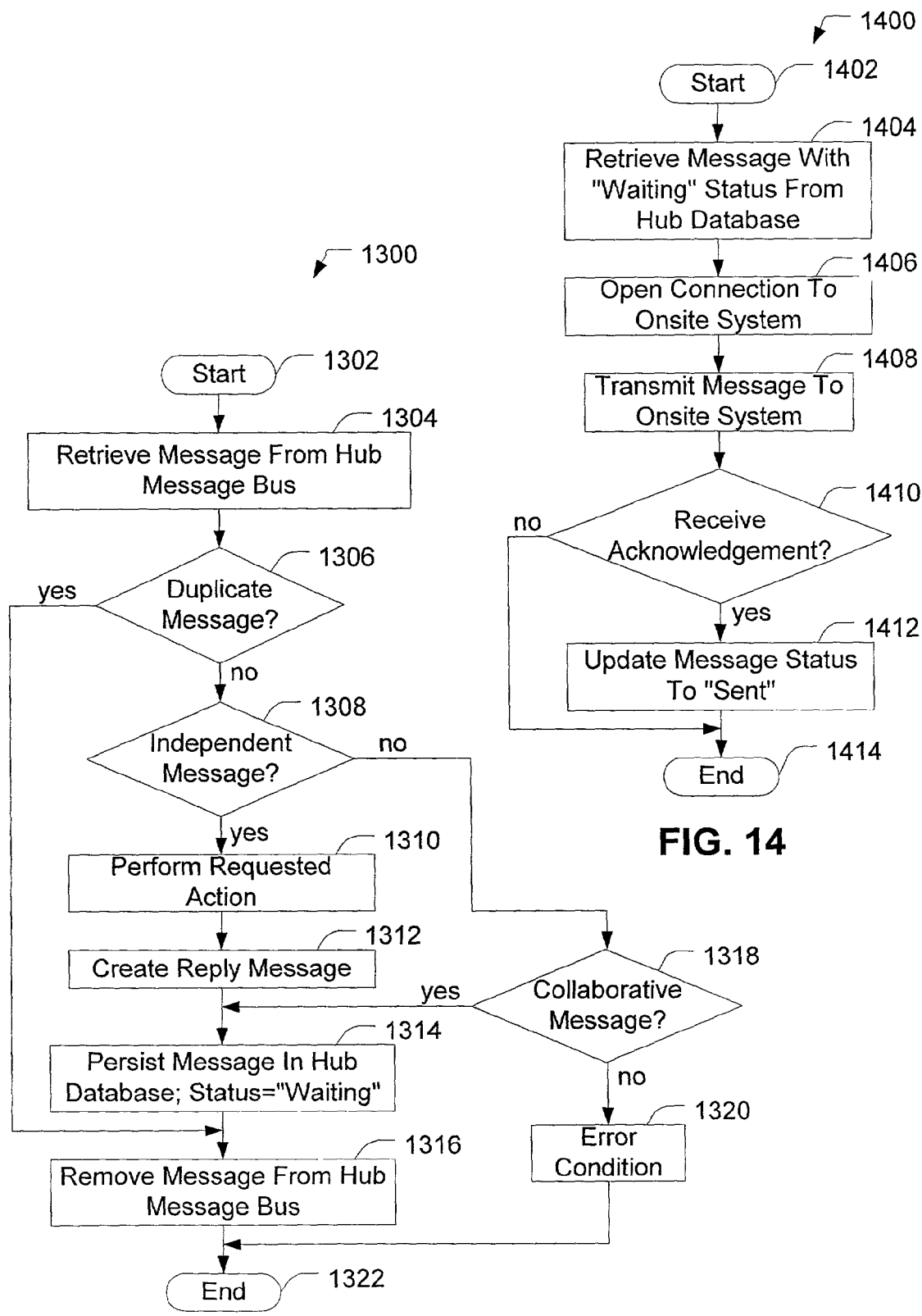
FIG. 13 illustrates a flow chart of an exemplary method by which a hub bus processing module processes a message, in accordance with one embodiment of the present invention.

FIG. 13 illustrates a flow chart of an exemplary method 1300 by which hub bus processing module 204 processes a message, in accordance with one embodiment of the present invention. Beginning at a start step 1302, a message is persisted in hub message bus 206. For example, hub receive module 202 may have persisted a message received from an onsite system 104 in hub message bus 206. As another example, an analytic engine 212 may have persisted a message containing the results of a previously requested analysis in hub message bus 206.

At step 1304, hub bus processing module 204 retrieves the message from hub message bus 206. In one embodiment, hub bus processing module 204 retrieves a copy of the message from hub message bus 206, and the message remains persisted in hub message bus 206. This ensures that the message can be recovered or retrieved in case an error is encountered (e.g., hub bus processing module 204 crashes, and the like). At step 1306, hub bus processing module 204 determines if the message is a duplicate message. In one embodiment, hub bus processing module 204 maintains, for example, a record of the messages it has processed. The list may contain the corresponding message IDs. Hub bus processing module 204 can then inspect the list to determine if the message is a duplicate message.

For example, a duplicate message can occur if hub analytic system 102, and in particular, hub receive module 202 received and persisted the message in hub message bus 206, but was unable to send an acknowledgement to the sending onsite system 104 (e.g., hub analytic system 102 crashed before the acknowledgement could be sent). In another example, the sending onsite system 104 may have transmitted the message and crashed before receiving an acknowledgement. In both instances, the sending onsite system 104 may have retransmitted the message upon coming back up.

If, at step 1306, hub bus processing module 204 determines that the message is a duplicate message, hub bus processing module 204 removes the message from hub message bus 206 at step 1316. Thus, the message is no longer persisted in hub message bus 206. Having removed the message persistence, hub bus processing module 204 ends processing at step 1322.

If, at step 1306, hub bus processing module 204 determines that the message is not a duplicate message, hub bus processing module 204 checks to determine if the message is an independent message at step 1308. If the message is an independent message (e.g., a message received from an onsite system 104 or a reply message to an onsite system 104 created by an analytic engine 212), hub bus processing module 204 performs any necessary action as requested in the message at step 1310.

For example, the message may be from an onsite system 104, and be a request to perform some action on a particular analytic engine 212. Here, hub bus processing module 204 can persist the message in hub message bus 206 for delivery to the appropriate analytic engine 212 configured to perform the requested action. As another example, the message may be from an onsite system 104, and be a request to obtain a list of onsite systems 104 registered with hub analytic system 102. Here, hub bus processing module 204 may be configured to process the request, and, if so, hub bus processing module 204 can retrieve the requested data from, for example, hub database 208.

At step 1312, hub bus processing module 204 creates any necessary reply message. For example, hub bus processing module 204 may create a reply message containing a list of the registered onsite systems 104 in response to a request by an onsite system 104 to obtain such a list. At step 1314, hub bus processing module 204 persists the message (e.g., the message retrieved from hub message bus 206 (step 1304) or the created reply message (step 1312)) in hub database 208. In one embodiment, hub bus processing module 204 persists the message by creating a message header record and a message data record for the message in hub database 208. Hub bus processing module 204 sets the status field in the message header record for the persisted message to "waiting" to indicate that the message is ready to be transmitted to its recipient onsite system 104. At step 1316, hub bus processing module 204 removes the message persistence in hub message bus 206 and method 1300 ends at step 1322.

If, at step 1308, hub bus processing module 204 determines that the message is not an independent message, then, at step 1318, hub bus processing module 204 determines if the message is a collaborative message sent by an onsite system 104. A collaborative message is a message from an onsite system 104 to another onsite system 104 that is transmitted or delivered through hub analytic system 102. If it is a collaborative message, hub bus processing module 204 persists the message in hub database 208 and sets the message status to "waiting" at step 1314. At step 1316, hub bus processing module 204 removes the message persistence in hub message bus 206 and method 1300 ends at step 1322.

If, at step 1318, hub bus processing module 204 determines that the message is not a collaborative message, then, at step 1320, hub bus processing module 204 records the error condition and method 1300 ends at step 1322. For example, hub bus processing module 204 can log the error condition and the offending message in an error file on hub analytic system 102. In one embodiment, hub bus processing module 204 can remove the message from hub message bus 206.

Figure 14:
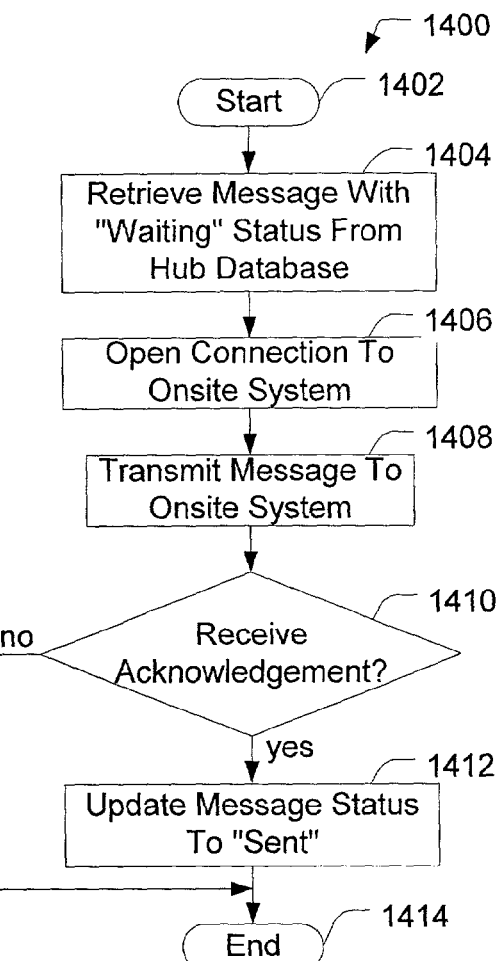
FIG. 14 illustrates a flow chart of an exemplary method by which a hub transmit module transmits a message, in accordance with one embodiment of the present invention.

FIG. 14 illustrates a flow chart of an exemplary method 1400 by which hub transmit module 210 transmits a message, in accordance with one embodiment of the present invention. Beginning at a start step 1402, a message requiring delivery to an onsite system 104 is persisted in hub database 208. For example, hub bus processing module 204 may have persisted a reply message or a point-to-point collaborative message in hub database 208, and set the status of the message to "waiting" to indicate that the message requires delivery. In one embodiment, hub bus processing module 204 may use the message header record and the message data record, or other similar records, to persist the message in hub database 208.

At step 1404, hub transmit module 210 retrieves the message with a "waiting" status from hub database 208. In one embodiment, the message remains persisted in hub database 208 and hub transmit module 210 retrieves a copy of the message from hub database 208. At step 1406, hub transmit module 210 requests a network connection, for example, over network 106 to the appropriate onsite system 104. Hub transmit module 210 may parse the message, or parts of the message, to determine the recipient of the message. Hub transmit module 210 may request a secure network connection to onsite system 104 that is to receive the message.

At step 1408, hub transmit module 210 transmits the message to the recipient onsite system 104 over the established network connection. At step 1410, hub transmit module 210 waits to receive an acknowledgement from onsite system 104. The acknowledgement indicates that the transmitted message has been successfully persisted by the recipient or the receiving node. In one embodiment, the acknowledgement is received over the same network connection. In another embodiment, the acknowledgement may be received over a different network connection.

If, at step 1410, an acknowledgement is not received within a predetermined time period (e.g., a timeout occurs), hub transmit module 210 ends processing at step 1414. Hub transmit module 210 can retransmit the message to the recipient onsite system 104 because the message remains persisted in hub database 208 with a status of "waiting." If, at step 1410, an acknowledgement is received, hub transmit module 210, at step 1412, updates the status in the message header record corresponding to the message to "sent," and method 1400 ends at step 1414. Updating the status to "sent" indicates that an acknowledgement was received and that the message need not be retransmitted to onsite system 104. The reliably delivered message can remain persisted in hub database 208. In another embodiment, reliably delivered messages may be removed or purged from hub database 208.

As described herein, the present invention, in at least one embodiment, provides for the reliable delivery of messages between a sender and a recipient. One embodiment of the present invention provides the ability to persist a message to ensure reliable message delivery. A sender persists a message in a storage device before sending a copy of the message to the message recipient. Persisting the message and transmitting a copy enables the sender to recover the message in case of error (e.g., power failure, system or module crash, and the like). The recipient receives the message and persists the message in a coupled storage device. If the message is successfully persisted, the recipient informs the sender by transmitting an acknowledgement. Reliable message delivery is achieved once the recipient successfully persists the message.

In at least one embodiment, the present invention provides for the reliable delivery of messages between two program modules. The sending program module persists the message in a coupled non-volatile memory device that is also accessible to the receiving or destination program module. The receiving program module retrieves a copy of the message from the memory device without destroying the persistence of the message. The receiving program module appropriately processes the message as necessary. In the course of processing the message, the receiving module can persist the retrieved copy of the message in another coupled non-volatile memory device. At this instance in time, the message is persisted in two non-volatile memory locations. If the message is successfully persisted, the receiving program module can remove the first or previous message persistence. Reliable message delivery is achieved because the receiving program module operates on a copy of the message without destroying the message persistence. Moreover, the initial message persistence is not destroyed until after the receiving program module successfully persists the message a second time.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. An analytic computer system for servicing requests from onsite systems, the analytic computer system being coupled to the onsite systems via a network, comprising:
   a plurality of analytic engines of the analytic computer system for providing computing services to the onsite systems;
   a message bus of the analytic computer system having a plurality of queues for holding messages and for facilitating reliable delivery of messages between components of the analytic system;
   a database of the analytic computer system that provides message persistence for messages being transmitted to the onsite systems and status information indicating whether the messages have been acknowledged as having been reliably delivered to the onsite systems;
   a receive module of the analytic computer system that receives from the onsite systems via the network requests to establish connections with the analytic computer system and receives from the onsite systems via the network messages, persists the received messages in the message bus, and upon successful persistence, transmits an acknowledgement to the onsite systems via the network;
   a bus processing module of the analytic computer system that retrieves messages from the message bus, determines whether a retrieved message requires processing by an analytic engine, upon determining that the message requires processing by an analytic engine, persists the message in a queue for the analytic engine, and creates an appropriate reply to the message; and
   a transmit module of the analytic computer system that provides connectivity between the analytic computer system and the onsite systems by retrieving messages from the database, establishing a network connection to the onsite systems, transmitting the retrieved messages to the onsite systems via the network, receiving acknowledgements from the onsite systems via the network, and updating in the database the status information of the messages to indicate acknowledgement of successful delivery of the messages.

2. The analytic computer system of claim 1 wherein the transmit module re-transmits the retrieved messages when an acknowledgement is not received from the onsite systems.

3. The analytic computer system of claim 1 wherein the message bus includes a queue for each analytic engine.

4. The analytic computer system of claim 3 wherein each analytic engine retrieves messages from its queue, performs actions according to the content of the messages, and persists a reply message in the message bus.

5. The analytic computer system of claim 1 wherein the transmit modules encrypts messages that are to be transmitted to the onsite systems.

6. The analytic computer system of claim 1 wherein a first analytic engine provides electronic mail services and a second analytic engine provides financial services.

7. The analytic computer system of claim 1 wherein a message received by the receive module is an independent message directed to the analytic computer system or a collaborative message directed to another onsite system.

8. A computer-readable storage device that is not a signal containing computer-executable instructions for controlling an analytic computer system to service requests from onsite systems, the analytic computer system being coupled to the onsite systems via a network, by a method comprising:
   providing access to a plurality of analytic engines of the analytic computer system for providing computing services to the onsite systems;
   providing access to a message bus of the analytic computer system having a plurality of queues for holding messages and for facilitating reliable delivery of messages between components of the analytic system;
   providing access to a database of the analytic computer system that provides message persistence for messages being transmitted to the onsite systems and status information indicating whether the messages have been acknowledged as having been received by the onsite systems;
   under control of a receive module of the analytic computer system,
      receiving from the onsite systems messages via the network;
      persisting the received messages in the message bus; and
      upon successful persistence, transmitting an acknowledgement to the onsite systems via the network;
   under control of a bus processing module of the analytic computer system,
      retrieving messages from the message bus;
      determining whether a retrieved message requires processing by an analytic engine; and
      upon determining that the message requires processing by an analytic engine,
         persisting the message in a queue for the analytic engine; and
         sending an appropriate reply to the message; and
   under control of a transmit module of the analytic computer system,
      transmitting the retrieved messages to the onsite systems via the network;
      receiving acknowledgements from the onsite systems via the network; and updating in the database status information of the messages to indicate acknowledgement of successful delivery of the messages.

9. The computer-readable storage medium of claim 8 wherein the transmit module re-transmits the retrieved messages when an acknowledgement is not received from the onsite systems.

10. The computer-readable storage medium of claim 8 wherein the message bus includes a queue for each analytic engine.

11. The computer-readable storage medium of claim 10 wherein each analytic engine retrieves messages from its queue, performs actions according to the content of the messages, and persists a reply message in the message bus.

12. The computer-readable storage medium of claim 8 wherein the transmit modules encrypts messages that are to be transmitted to the onsite systems.

13. The computer-readable storage medium of claim 8 wherein a first analytic engine provides electronic mail services and a second analytic engine provides financial services.

14. The computer-readable storage medium of claim 8 wherein a message received by the receive module is an independent message directed to the analytic computer system or a collaborative message directed to another onsite system.

15. A method performed by an analytic computer system to service requests from onsite systems, the analytic computer system being coupled to the onsite systems via a network, the method comprising:
  providing access to a plurality of analytic engines of the analytic computer system for providing computing services to the onsite systems;
  providing access to a message bus of the analytic computer system having a plurality of queues for holding messages and for facilitating reliable delivery of messages between components of the analytic system;
  providing access to a database of the analytic computer system that provides message persistence for messages being transmitted to the onsite systems and status information indicating whether the messages have been acknowledged as having been received by the onsite systems;
  under control of a receive module of the analytic computer system,
    receiving from the onsite systems messages via the network;
    persisting the received messages in the message bus; and
    transmitting an acknowledgement to the onsite systems via the network;
  under control of a bus processing module of the analytic computer system, retrieving messages from the message bus; and
    upon determining that the message requires processing by an analytic engine,
      persisting the message in a queue of the message bus for the analytic engine; and
      sending an appropriate reply to the message; and
  under control of a transmit module of the analytic computer system,
    transmitting the retrieved messages to the onsite systems via the network;
    receiving acknowledgements from the onsite systems via the network; and
    updating in the database status information of the messages to indicate acknowledgement of successful delivery of the messages.

\* \* \* \* \*